United States Patent
Weeks

(10) Patent No.: US 6,363,467 B1
(45) Date of Patent: Mar. 26, 2002

(54) APPARATUS AND METHOD FOR ALLOCATING MEMORY SPACE FOR PROGRAM USE AND MANAGEMENT PURPOSES

(75) Inventor: Richard Weeks, Felixstowe (GB)

(73) Assignee: British Telecommunications plc, London (GB)

(*) Notice: Subject to any disclaimer, the term of this patent is extended or adjusted under 35 U.S.C. 154(b) by 0 days.

(21) Appl. No.: 09/171,914
(22) PCT Filed: Sep. 24, 1998
(86) PCT No.: PCT/GB98/02883
　§ 371 Date: Oct. 29, 1998
　§ 102(e) Date: Oct. 29, 1998
(87) PCT Pub. No.: WO99/15965
　PCT Pub. Date: Apr. 1, 1999

(30) Foreign Application Priority Data

Sep. 25, 1997 (EP) .............................. 97307664
Sep. 25, 1997 (GB) .............................. 9720460

(51) Int. Cl.[7] ............................................... G06F 12/00
(52) U.S. Cl. ...................... 711/170; 709/104; 711/173
(58) Field of Search ................ 711/170–173; 709/104–105

(56) References Cited

U.S. PATENT DOCUMENTS

| | | | |
|---|---|---|---|
| 5,604,864 A | * | 2/1997 | Noda ........................... 714/47 |
| 5,784,699 A | * | 7/1998 | McMahon et al. ........... 711/171 |
| 5,809,554 A | * | 9/1998 | Benayon et al. ............. 711/171 |
| 5,930,829 A | * | 7/1999 | Little ........................... 711/170 |
| 6,058,460 A | * | 5/2000 | Nakhimovsky .............. 711/153 |

* cited by examiner

*Primary Examiner*—Matthew M. Kim
*Assistant Examiner*—Pierre M. Vital
(74) *Attorney, Agent, or Firm*—Nixon & Vanderhye, P.C.

(57) ABSTRACT

In order to reduce problems caused by a user corrupting memory by incorrect use of memory allocation functions in the C programming language, memory allocation requests of an application (32) are monitored by a monitor sub-process (34) during run-time, and invalid memory allocation requests are detected and the application interrupted by the monitor sub-process. Additionally, an allocator sub-process (42) external to the application performs the memory allocation requests to shield the memory from user errors. A start-up dialog (48) synchronises the application (32) and allocator (42), and the allocator maintains during run-time a memory segment (46) conforming to the memory (44) allocated to the application.

16 Claims, 4 Drawing Sheets

APPARATUS AND METHOD FOR ALLOCATING MEMORY SPACE FOR PROGRAM USE AND MANAGEMENT PURPOSES

RELATED APPLICATIONS

This application is related to EP97307664.9 filed on Sep. 25, 1997, GB9720460.6 filed on Sep. 25, 1997, and PCT/GB98/02883 filed Sep. 24, 1998.

BACKGROUND OF THE INVENTION

The invention relates to monitoring and/or performing of memory allocation to an application, in particular in C.

The computer programming language C is a high level programming language which is structured, modular and compiled. The language is widely known having been developed in the early 1970's. It is capable of operation in various environments including the MS-DOS environment and the UNIX environment. One aspect of C programs is the manipulation of memory using the malloc family of functions (malloc, realloc, free etc.) forming, for example, the standard C dynamic memory allocation package. The malloc function dedicates an area of memory to a given variable. In such known systems, however, a problem arises in that these dynamic-memory allocation routines use memory that may be interleaved with memory allocated for the user. If the user overwrites memory, the memory allocation process can be corrupted. Problems can arise, for example, from freeing unallocated memory, reallocating unallocated memory, or writing outside the bounds of allocated memory. All these types of operation can corrupt the memory allocator. Freeing unallocated memory and reallocating unallocated memory often causes an immediate crash. Writing to unallocated memory will sometimes just corrupt application data, but can also cause a crash at some later time. Attempts to track the problems running under a debugger, or inserting debugging code can both fail to resolve the problem as that can modify the execution environment, sufficiently to mask the original problem. For example, EP-A-729097 describes a debug system which monitors memory access errors of an application program; whilst monitoring takes place during run-time, the application program runs within the debug system environment.

As an example of inserting debugging code, Proceedings of the Winter USENIX Conference, 20.01.92, pages 125–136 Reed Hastings et al.: "Purify: Fast Detection of Memory Leaks and Access Errors", describes a tool which detects memory leaks and access errors by inserting additional checking instructions directly into the object code of the application.

The document "Static Detection of Dynamic Memory Errors", Evans D., ACM SIGPLAN NOTICES May 1, 1996, pages 44–53, describes the use of annotations for detecting at compile time errors such as dead storage, memory leaks and dangerous liaising. This introduces extra complication.

SUMMARY OF THE INVENTION

In order to avoid or at least reduce these problems, in a first aspect the invention provides an apparatus for monitoring allocation of memory space during run-time of a program which makes memory allocation requests, the apparatus characterised by monitor means arranged in use to execute as a process separate from that of said program, the monitor means including allocator means responsive to memory requests of the program and arranged to allocate segments of memory in response thereto.

In a second aspect the invention provides a method of monitoring allocation of memory space during run-time of a program, the method comprising:
1) running said program, said program making memory allocation requests;
2) executing a monitoring means as a process separate from said program and responsive to said memory allocation requests; and
3) the monitoring means allocating segments of memory to said program in response to said memory allocation requests.

In a preferred embodiment, invalid memory allocation requests are detected by a monitor sub-process and the monitor sub-process interrupts the application on detection of an invalid memory allocation request. As a result, when the system is run, more reliable applications are achieved, and memory leakage can be identified and plugged reducing the likelihood of programs running out of memory space and, as memory paging may be reduced, improved speed.

The invention is flexible in that its use is not dependent on a debugger, and it may be used without a debugger, in which case if the application is interrupted, and the user has the choice of continuing to abort. Alternatively a debugger may be used subsequently to investigate the invalid request. Alternatively the sub-process may be used with a debugger, in which case the debugger will break into the application upon interruption.

An allocated memory list may be maintained by the monitor sub-process, allowing yet further improved memory monitoring. The invalid memory allocation requests may include one or more of the group of:
free unallocated memory;
free already freed memory;
reallocate unallocated memory;
reallocate already freed memory;
allocate or reallocate negative, zero size or excessive amount of memory;
memory allocator corrupted.

Memory allocation requests may be performed by an allocator sub-process external to the application. The memory disposition of the allocator sub-process and the application may be synchronised on start-up of the application. As a result the application process and/or memory monitor can run in an environment that is guaranteed to be safe. Because of memory synchronisation the memory allocator returns a valid address.

On start-up of the application the monitor sub-process may be started up and one or more of the following group of user options presented:
activate monitor sub-process;
activate allocator sub-process;
provide larger allocation than requested memory allocation;
set break point;
present leakage report.

The application may run under the computer language C and memory allocation requests are carried out under the malloc family of functions. Alternatively the invention can extend to C++, using the malloc family and, in addition, the "new" and "delete" operators. As "new" and "delete" may be implemented at a lower level in terms of "malloc" and "free", the applicability of the invention will be undiminished. All "realloc" calls may be replaced with the "malloc+copy" operation.

According to the invention there is provided a system for performing allocation of memory space requested by an application, in which memory allocation requests are passed to, and performed by, an allocation sub-process external to the application, and in which the memory disposition of the allocator sub-process is synchronised with the memory disposition of the application upon start-up of the application. The memory allocation requests may be performed at run-time. As a result operation of an application can be rendered yet safer.

According to a further aspect of the invention there is provided a computer apparatus comprising an application to be executed requiring allocation of memory space, and an allocator process external to the application and operative during run-time to perform memory allocation requests of the application.

BRIEF DESCRIPTION OF THE DRAWINGS

Embodiments of the invention will now be described, by way of example, with reference to the figures of which.

DETAILED DESCRIPTION OF THE INVENTION

Details of the C programming language will be known to the skilled person and are not reproduced here. C programs can be run under various environments such as DOS and UNIX on a wide range of conventionally available computer systems. A program written in C is compiled by a separate compiler program which generates the object code executed by the computer running the program. As a result C is interchangeable across different computer systems. The language is particularly useful for compact, quickly executed programs which need to be transportable between computers. One aspect of the C language is the incorporation of the malloc family of functions, introduced to avoid difficulties where a variable or string is declared as a pointer to an address location. In these cases automatic allocation of memory space is not carried out; instead a random location in memory is pointed to Referring to FIG. 1 there is shown a conventional computer system operating within the C language environment and comprising an application 10, a memory allocation unit 12 and a memory 14. As will be described in more detail below, when application 10 requires memory, it issues an instruction from the malloc family of functions, and unit 12 handles the memory allocation from memory 14. The memory allocation is shown schematically as a string of addresses UUUAAUUUAA . . . where U is memory allocated to application 10 and A is a reserved memory location for allocation unit 12 which is required for management and supervision purposes. As will be described in more detail below, problems arise for example when the user attempts to overwrite allocated memory and in particular attempts to overwrite memory locations reserved for allocator unit 12.

Despite the introduction of the malloc family of functions, however, the problems discussed in more detail above can still arise. Referring to FIGS. 2 to 6 the invention provides a process which solves problems both with the malloc-type functions and with previous proposals tracking those problems by running under a debugger or inserting debugging code.

Figure 2:
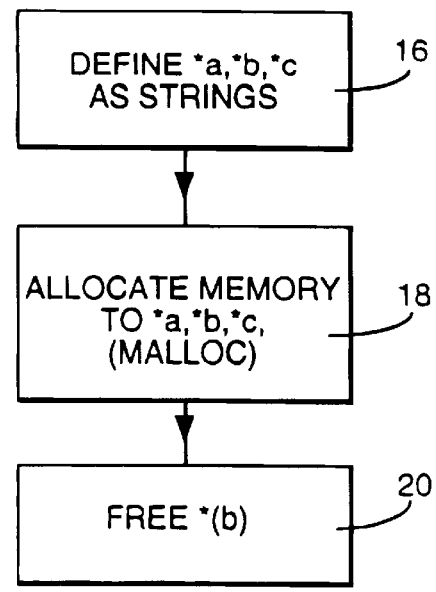
FIG. 2 is a flow diagram illustrating operation of a "clean" application.
Figure 3A:
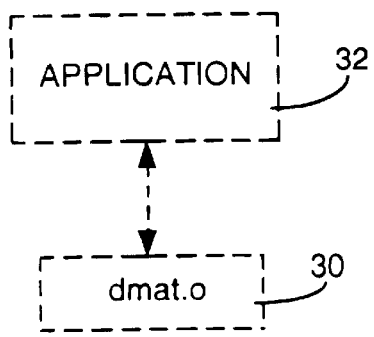
FIG. 3a illustrates an application linked under the present invention.
Figure 3B:
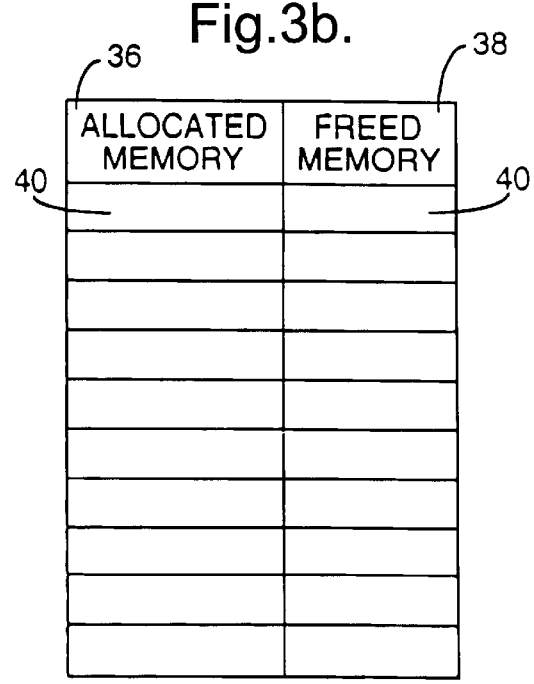
FIG. 3b illustrates allocated and free memory segment lists maintained under the invention.
Figure 4:
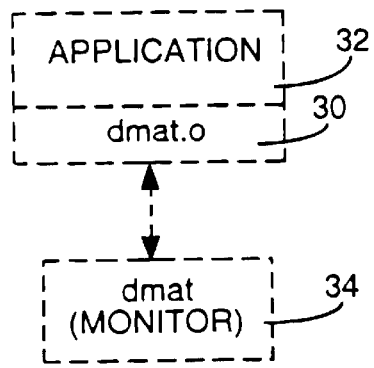
FIG. 4 shows the application of FIG. 3 run under a monitor sub-process.

A "clean" application is demonstrated by the C program illustrated in the flow chart of FIG. 2. A string is defined to three variables at step 16. At step 18 memory is allocated to each variable using the malloc function. The next instruction is to free the memory space assigned to one of those variables at step 20. As there are no inconsistencies leading to corruption of the memory allocator no problems occur in running the program. The corresponding program listing and output shown in Appendix A1 are illustrative of that produced under the present invention and are discussed in more detail below.

As an illustration of problems that can arise, if on the other hand the initial instruction is to free memory that has not been allocated this will evidently lead to corruption. The corresponding program listing and subsequent output according to the present invention is shown in Appendix A2 and discussed in more detail below.

The invention overcomes these problems by running sub-processes that track or optionally perform dynamic memory allocations in a C application as shown in FIGS. 3a, 3b, 4 and 5. An object file under a suitable file name such as "dmat.o" (dmat standing for dynamic memory allocation troubleshooter) 30 is maintained and the application 32 is linked to the object file 30. The application 32 is then invoked in the normal manner which will be evident to the skilled person. As soon as the application attempts a first dynamic memory allocation, a monitoring sub-process "dmat" 34 is formed. This sub-process 34 monitors the sanity of memory allocation requests and causes the application to be interrupted when problems are detected. The sub-process 34 maintains lists 36,38 of allocated and freed memory segments 40 together with their sizes. These lists are consulted when the application needs to perform memory allocation operations. Because memory allocation is tracked in an independent process the tracking operations do not impinge on the behaviour of the application. Accordingly the source code is unmodified and carries out its processing in separate processors, so that the application's behaviour is not modified when the sub-process is linked in (unless stack corruption is the root of the problem).

Figure 5:
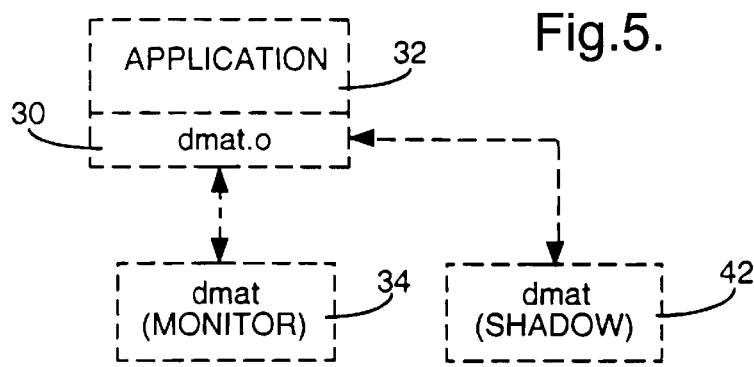
FIG. 5 shows the application of FIG. 4 additionally run under a shadow sub-process.
Figure 6:
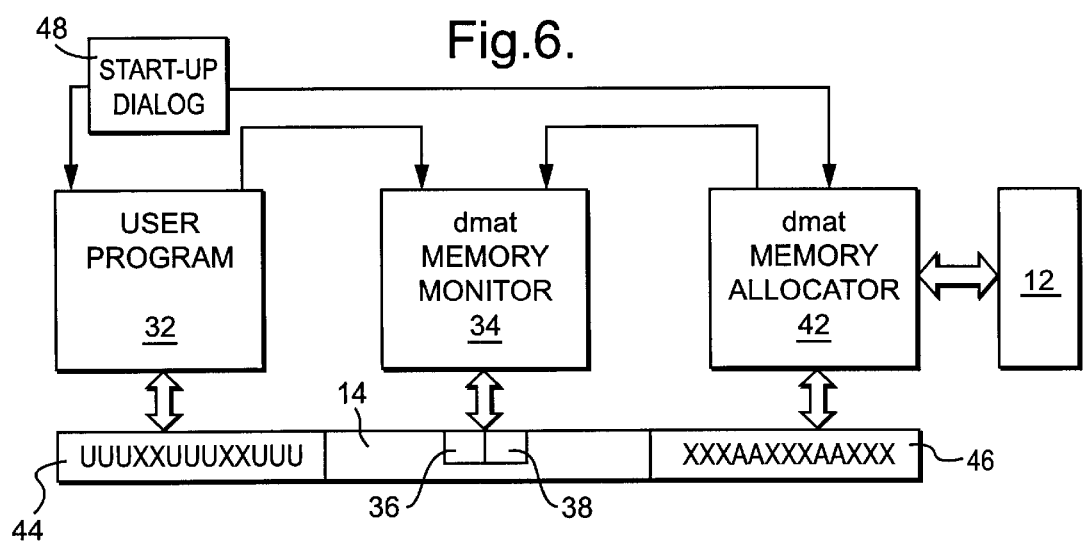
FIG. 6 is a block diagram illustrating the interaction of the various sub-processes.

A second dmat sub-process 42 is spawned as shown in FIGS. 5 and 6. This second sub-process 42 takes over memory allocation operations from the application process 32, allowing them to run in an environment that is guaranteed to be safe, hence providing one way of running a faulty program.

For most de-bugging and checking purposes the allocator sub-process will only be used in conjunction with the monitor sub-process, because report errors—as provided by the monitor sub-process—will always be needed.

However in use on critical applications it may be desirable to run the allocator sub-process in a final application, rather than just during de-bugging, which could reduce the chances of failure yet further, or at least defer a program crash.

Operation of the system is discussed in more detail below, but in essence the monitor tracks all memory allocation operations and flags inconsistencies. The memory allocator 42 initially synchronises itself with the user program's memory disposition. Requests for dynamic memory are performed in the memory allocator program and not in the user program. The memory allocator 42 returns an address which because of the initial synchronisation is valid in the context of the user program 32. If the user program 32 corrupts an area outside its allocated memory, it only affects its local memory and not that of the memory allocator 42. Integrity of the memory allocation process is therefore not disruptable by user errors.

As can be seen from FIG. 5, the second sub-process 42 can be viewed as a shadow sub-process. The application 32 and the shadow sub-process 42 communicate in terms of memory breaks. As will be well known to the skilled person these memory breaks comprise the underlying mechanism on which dynamic memory allocation is based, accessed by suitable system calls for example "brk()" and "sbrk()" system calls. Under this system the application 32 and shadow 42 processes negotiate to align their memory breaks. Then each allocation operation request is passed to the shadow process 42 where it is executed, and the new breaks are passed back to the application.

The monitor sub-process 34 should never fail, however it is of course possible to make the shadow sub-process 42 crash by forcing it to do operations that are deemed dangerous under operation of the invention. In these circumstances, the application itself would also have failed.

The shadow process 42 will now be described in more detail, with reference to FIGS. 6 and 7.

Figure 1:
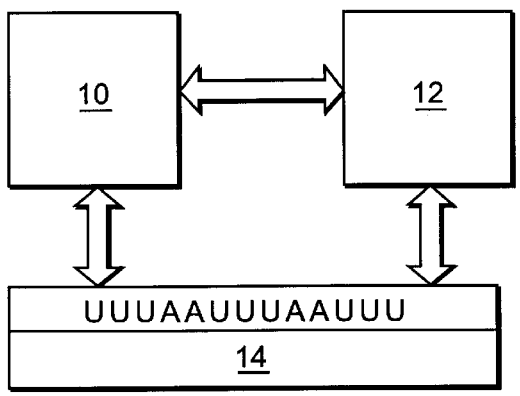
FIG. 1 shows a computer system including an application employing a memory allocator of the C language to access memory.

Referring to FIG. 6 it may be seen that memory allocator unit 42 handles all memory negotiations with memory allocator unit 12, and effectively forms a shield or barrier between unit 12 and the user program or application 32, in contrast to the arrangement shown in FIG. 1. The memory 14 has a first segment 44 shown schematically as a string of locations UUUXXUUUXXUUU . . . where U are memory locations allocated to the application program and X are unassigned locations. A further memory segment 46 is provided which corresponds in all respects to memory segment 44 except that the memory locations are represented as XXXAAXXXAAXXAA . . . where X represents unused memory and A represents memory reserved by the allocator unit for management and supervision purposes.

Thus allocator unit 42 shadows the allocation of memory to application 32 and keeps a segment of memory which corresponds to that allocator 2 application program 32. It does this by ensuring that upon start up of the application the allocator 42 and application 32 are synchronised in terms of their "break" value by a start-up dialog unit 48. This is a standard Unix process and a break value represents the first free address that can be dynamically allocated. Thus although memory segments 44 and 46 have different physical locations, they have the same virtual address for the purposes of the application. Ensuring that allocator 42 and application 32 are synchronised or initialised with the same break value, automatically ensures that the program segments 44 and 46 will develop with exactly the same structure.

To make the two breaks the same, one has a start-up dialogue in the form:

main process to shadow process: "my break is at address xxx, set yours to that value" shadow process to main process: "ok, done"

or:

shadow process to main process: "can't! It's already higher than that, at yyy"

main process (to itself): "ok I'll set mine to yyy as well, then"

In practice the latter is unlikely (but easily handled), since the main program is likely to be bigger than the shadow process, and so its break is likely to be the greater of the two.

Now, with the breaks synchronised, a memory allocation request in the main program is guaranteed to give the same result as in the shadow process. So, instead of the following interaction with real-life memory allocator 12:

main process to in-built allocator: "give me 100 bytes"

in-built allocator: (moving break up possibly 100 bytes, possibly more, and possibly not at all, if it's re-using released space): "ok, use the memory at address zzz"

with the assistance of a shadow process, this turns into:

main process to (intercepted) allocator: "give me 100 bytes"

(intercepted) allocator to shadow process: "give me 100 bytes"

shadow process' in-built allocator: (moving break up possibly 100 bytes, possibly more, and possibly not at all, if it's re-using released space): "ok, use the memory at address zzz, and move the break to bbb (intercepted) allocator to main process (moving the break if/as directed): "ok, use the memory at address zz"

So, the 'break' of the main process gets manipulated precisely as if the memory allocator were doing it, but if the user program corrupts the memory that the allocator would normally be using for its own devices, no bad thing happens, because the actual working memory for the allocator is in a separate process.

Memory corruption can mean:

overwriting user data overwriting the area used by the memory allocator itself.

The shadow process prohibits the second of these effects, viz corruption of the memory allocator. In a program, one might have, in effect, the following dialogue, say:

user program: give me 100 bytes of memory (area A)

allocator: ok, addresses 2000 to 2099 are yours user program: give me another 100 bytes of memory (area B)

allocator: ok, addresses 2120 to 2219 are yours (Note that, quite realistically, the allocator doesn't provide a contiguous area. Here it's omitting the 20 bytes at addresses 2100 to 2119).

Now some typical programming errors:

1) the user program mistakenly writes to the 200th byte of area A, which is actually only 100 bytes long. The effect is to modify part of area B, so that when the user accesses it, it can contain an unexpected value;

2) the user program mistakenly writes to the 110th byte of area A. This is in the area used by the memory allocator itself, and when the memory allocator is invoked again, something is likely to fail, but the symptoms are difficult to predict;

dmat overcomes this second type of error. It does this by firing off a completely separate Unix process, shadow process 42, specifically to assist memory allocation. dmat also intercepts the original calls to the memory allocator so it can inset its own actions, and return values as if they had come from the original allocator. Now the dialogue is:

user program: give me 100 bytes of memory (area A)
interceptor: command to shadow process: give me 100 bytes of memory
shadow process: ok interceptor, addresses 2000 to 2099 are yours
interceptor: ok user, addresses 2000 to 2099 are yours
user program: give me 100 bytes of memory (area B)
interceptor: command to shadow process: give me 100 bytes of memory
shadow process: ok interceptor, addresses 2120 to 2219 are yours
interceptor: ok user, addresses 2120 to 2219 are yours Thus actual memory allocation takes place only in the shadow process. The shadow process doesn't make its memory available to the original process it can't, it's completely separate. Instead, it simply signals back the address range at which the new memory is available. The original program can then use this address range in the normal way.

Now the same, typical, programming errors, again.

1) the user program mistakenly writes to the 200th byte of area A, which is actually only 100 bytes long. The effect is to modify part of area B, so that when the user accesses it, it can contain an unexpected value.

2) the user program mistakenly writes to the 110th byte of area A. This is in the area used by the memory allocator itself, but the memory allocator isn't running in this process, so it can't get corrupted.

The shadow process has two applications:

Firstly, it can be used inside a tool like dmat, where it's another facility that can be used as part of the debugging armory.

Secondly, instead of using the shadow process as a debugging aid, it could be incorporated into a system as a permanent part, offering more robust memory allocation from existing memory allocation software.

As a practical example, a telephone exchange which would be a major embarrassment if it fails due to a memory-allocation problem. The software is extremely complex, and demands (let us suppose), the use of dynamic-memory allocation. Given that there will be bugs that might corrupt the memory allocator, and given the ability to prevent these problems (with the shadow-process), it would be possible to use the shadow-process technique outside dmat where dynamic-memory allocation has to be used, and optimum robustness is desirable.

Operation of the invention will now be discussed in more detail. The process runs in two phases. The first, start-up phase comprises a dialogue allowing the user to customise behaviour of the process. The second phase comprises actual operation of the process under which a report is issued whenever an unsafe dynamic memory operation is detected.

It will be noted that much of the specific description relates specifically to the malloc and free functions but that the teachings, where appropriate, are equally applicable to other operations in the function including realloc, calloc, and cfree.

Figure 7:
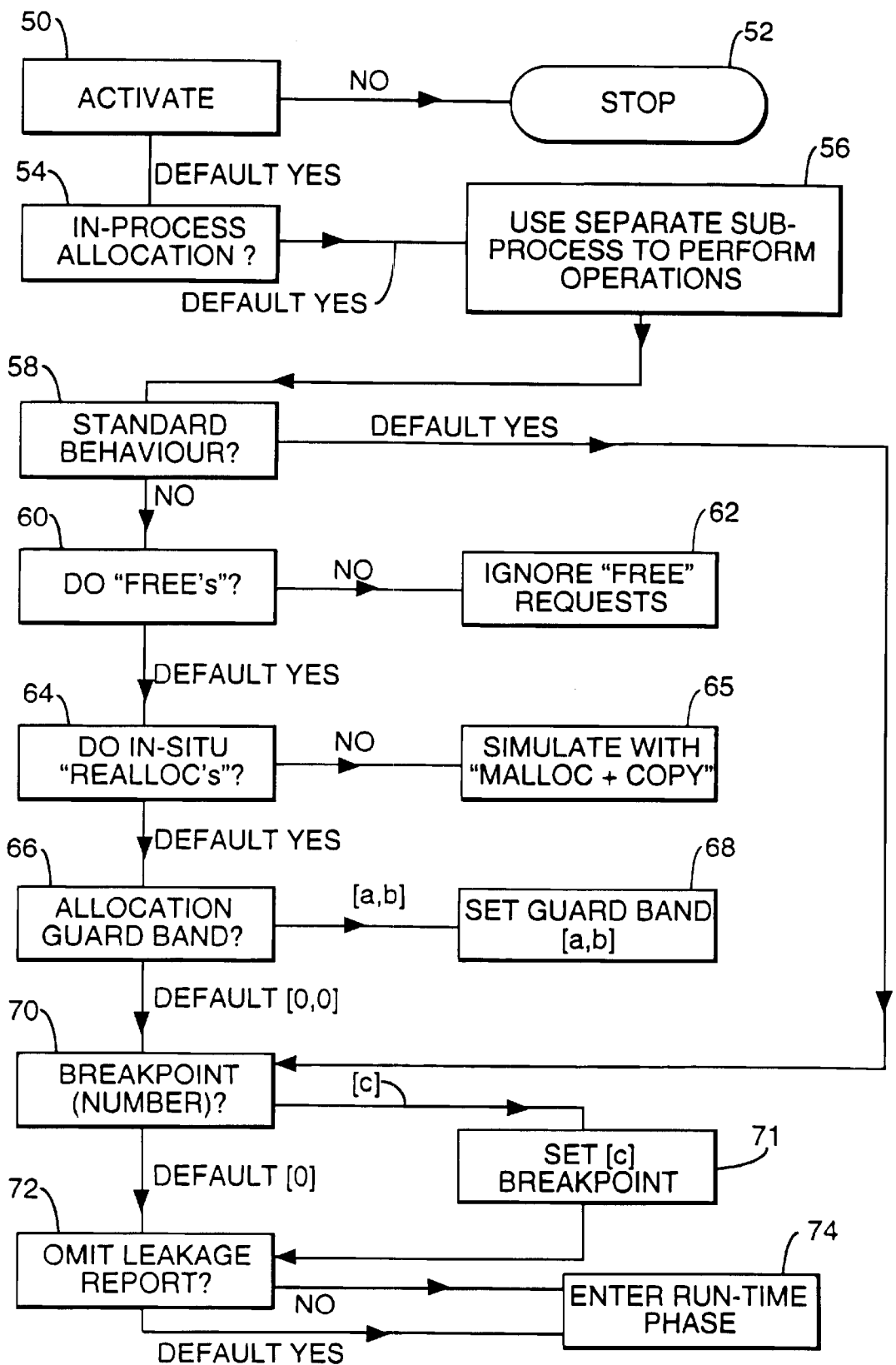
FIG. 7 is a flow chart illustrating the start-up dialogue.

The start-up dialogue is illustrated in the flow chart of FIG. 7. As can be seen, when the process is started up the user is led through a set of configuration questions. Each question is represented by a box in the flow chart and, preferably, a default option is set which is represented by an arrow descending from the bottom of the box to show the program flow following the default answer. The non-default answer is represented by an arrow extending from a side of the box in the flow chart shown in FIG. 7. Implementation of the dialogue can of course be in any suitable form but, for example, the non-default answer can be obtained by pressing the letter indicated in the dialogue question whilst the default answer can be obtained by pressing carriage return. The options are preferably all expressed to allow as far as possible the same default answer (e.g. "yes") . The default options are preferably set such that, in default, the most common mode of operation is selected, reducing user input accordingly.

Firstly, at step 50, the user is given the option whether to activate the process or not. If the answer is no then the process stops at step 52. If the default answer yes is selected the dialogue proceeds to step 54 in which the user is given the default option of using the allocator sub-process, in particular the applications malloc, realloc and free routines linked in from the C library to manipulate dynamic memory in the default option at step 56 giving greater resilience to allocator corruption.

The dialogue then proceeds to step 58 allowing the user the default option of standard behaviour in relation to dynamic memory allocation, i.e. the default of steps 60, 64 and 66 discussed below, allowing those steps to be skipped and proceeding directly to step 70 discussed below. In the alternative the process can intercept malloc, realloc and free calls and apply various modifications to their behaviour.

At step 60 the user can either follow the default option in which case the process passes calls to free to the C-library or the alternative option of ignoring free requests [step 62]. If ignoring calls to free changes the behaviour of an application it may well contain suspect calls.

Proceeding to step 64 the user is offered the default option of having calls to realloc passed directly to the C-library. Alternatively, realloc requests that would be satisfied in-situ (by granting memory at the supplied address rather than at a new one) are simulated by malloc plus copy calls [step 65]. Following this option the effects of passing realloc an invalid address can be avoided. If disabling in-situ reallocs changes the behaviour of an application it may well contain suspect calls.

As an example of how realloc is simulated by malloc+ copy 100 bytes of memory are allocated by:

a=malloc (100);

and it is later desired to extend it to 200 bytes; use "realloc":

a=realloc (a, 200);

Exactly what realloc does depends on the implementation, but if the memory just beyond the original end of "a" is already being used, it must copy "a" to somewhere else, and return a new value for "a". However, if there is room, "realloc" may just extend the space available to "a", and so return the same address. This situation is termed an "in-situ" realloc. Now, if a program bug means that "a" no longer contains a valid address, then:

a=realloc (a, 200);

is likely to fail, since "realloc" is being handed bad information. The "malloc+copy" operation intercepts all "realloc" calls and replaces them with (for the current example):

new_a=malloc (200);

memcpy (new_a,a,200);

This way, the fact that "a" contains a bad value does not matter. As with dmat in general, one would try this tactic, see what happens, and infer something from the results.

At step 66, following the default option the amount of memory requested in malloc and realloc calls is allocated. In the alternative [step 68] the requested memory can be placed within a larger allocation. The user is invited to input upper and lower limits, in bytes, for the guard-band. A guard-band set by the user at zero bytes below and 4 bytes above would, for example, lessen the effects of writing one element beyond the end of a dynamically-allocated array. Lower and upper guard-bands are expressed as a positive number of bytes. These numbers are rounded up to a multiple of 4 bytes in order to avoid memory alignment problems.

The process now proceeds to step 70 which may also have been reached directly on the non-default option of step 58. The user has the opportunity to set the break-point as a number. In the default option the application is run until it detects a problem. Alternatively the process can be stopped at a specified operation set by the user [step 71]. The default value is set at zero which, as dmat starts at operation 1, simply means do not stop. Generally a break-point will be set after a previous run of an application has reported a suspect operation. When a break-point is encountered the application state can be examined with a debugger.

Proceeding now to step 72 the user can choose whether to omit a "leakage report" (in the default option). In the alternative outstanding unfreed memory is reported when the application terminates. The default option is set to "omit" because otherwise the resultant output can be lengthy.

With regard to the leakage report for complex situations it should be borne in mind that several of the C-library functions themselves use dynamic memory allocation—"fprintf", for example. Some of this memory may not be freed until after the dmat monitoring process terminates (which is the first step taken when the process is exited). Unclosed files can contribute to the memory leakage.

The dialogue is then completed and the application enters its run-time phase at 74.

Operation of the second, run-time phase is best explained by way of example. During this phase a first sub-process monitors allocation requests and a second sub-process optionally carries out all allocations. Accordingly, all calls to malloc, realloc and free are monitored and irregularities reported. As discussed above in relation to FIG. 2 and Appendix A1, with a "clean" application the process simply prints a banner indicating that it is operational and closing statistics setting out, for example, the number of malloc, realloc and free calls. The realloc statistic can specify the number of in-situ and copy calls. In addition the maximum memory allocated and the final memory allocated (which will have been reduced because of the freeing of one of the variables) is indicated.

As discussed in relation to Appendix A2 above, when a problem is encountered the application is halted and various options are offered dependent on the nature of the problem. The error messages preferably indicate the operation number and provide explanation text as to what options are available. Similarly to the operation of the start-up dialogue, each error message preferably carries a default option (for example obtained with a carriage return) under which the application behaves as though the monitoring process were absent; that is, operation is executed even though it is suspect. For example, where an application attempts to free memory that has not been allocated then an error message is produced indicating the operation number giving rise to the error and offering the options of abort, do or omit. Abort terminates the program, do executes the suspect operation and the application continues and omit allows the application to continue without executing the suspect operation. One preferred format in which the options are set out is shown in Appendix A2.

In addition to freeing unallocated memory as discussed above various other problems can be dealt with according to the invention.

Figure 8:
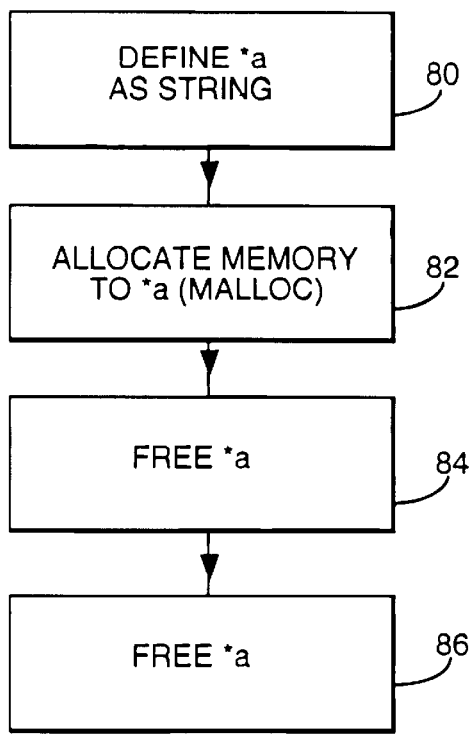
FIG. 8 illustrates memory corruption in one form.

The process detects attempts to free memory that has been previously allocated and subsequently freed. Referring to FIG. 8, at step 80 a string is defined to a variable, at step 82 a memory value is assigned to the variable by calling malloc, at step 84 the memory is freed and at step 86 it is attempted to free the memory again. In that case the monitoring process produces an error message indicating that an error occurred at step 86 as the memory had already been freed and offers the choices of abort—terminate the program, do—execute the suspect operation and continue or omit—continue without executing the suspect operation. The corresponding program listing and output messages are shown in Appendix A3.

The process can also detect attempts to reallocate memory that has been previously allocated and subsequently freed. In that case an error message is produced indicating the operation number and that the proposed realloc step was not possible because the old address had not been allocated. The choices of abort—terminate the program, do—execute the suspect realloc operation and continue, or salvage—replace the realloc with a malloc and a memory copy are offered. The programming listing and output messages are shown in Appendix A4.

Figure 9:
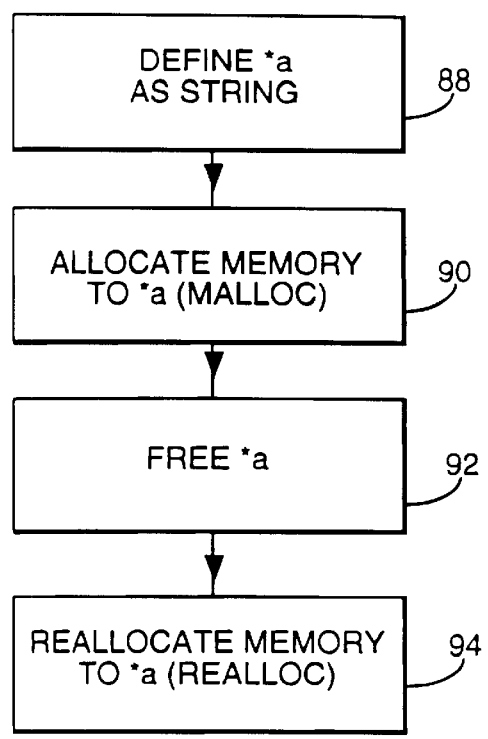
FIG. 9 illustrates memory corruption in another form.

Referring to FIG. 9, the process also detects attempts to reallocate a memory address that has not previously been allocated. At step 88 a string is defined to a variable and at step 90 memory is allocated to the variable by calling malloc. At step 92 that memory is freed and at step 94 the program attempts to reallocate a memory address to the variable which fails because the memory had previously been freed. Accordingly an error message is produced indicating that the error occurred in step 94 and that the address had already been freed at step 92 and the user is offered the options of abort—terminate the program, do—execute the suspect operation and continue, or salvage—replace the realloc with a malloc. The corresponding program listing and messages output by the process are shown in Appendix A5.

Figure 10:
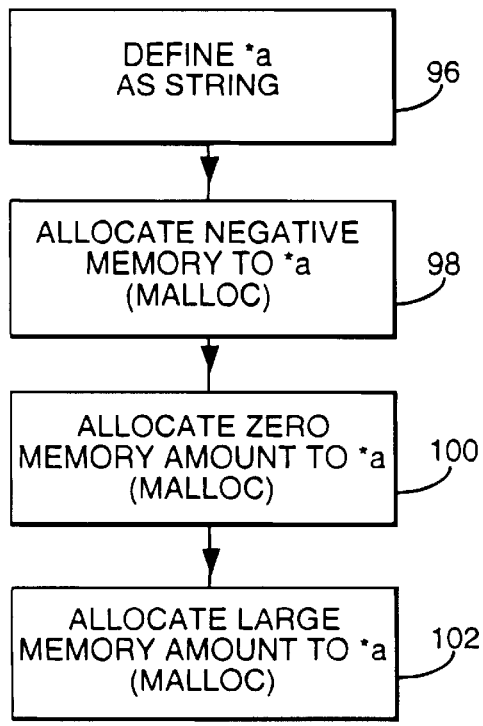
FIG. 10 illustrates memory corruption in another form.

Referring to FIG. 10, suspect memory size requests are detected, in particular attempts to allocate or reallocate a negative, zero size or very large amount of memory. At step 96 a string is defined to a variable, and at steps 98, 100 and 102 respectively a negative, zero and a very large amount of memory is allocated. The process accordingly produces corresponding error messages indicating that at step 98 a suspect negative amount was allocated, at step 100 a suspect zero amount was allocated and at step 102 a suspect very large amount was allocated. The user can select one of the options abort—terminate the program, or do—execute the suspect allocation operation and continue. It will be noted that similar error messages and options can be used for the corresponding malloc and realloc errors. Although, strictly, malloc and realloc interpret the memory amount argument as unsigned, the monitoring process interprets the size requests similarly but also gives a signed equivalent where it seems appropriate. A corresponding programming listing and output messages are shown in Appendix A6.

Figure 11:
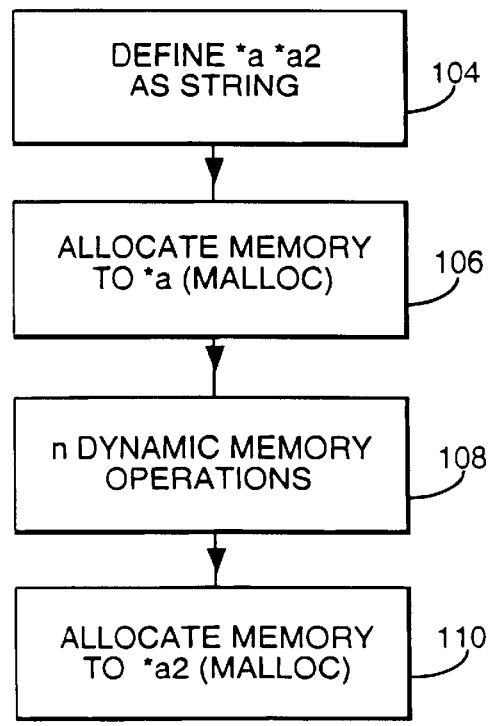
FIG. 11 illustrates memory corruption in a further form.

Referring now to FIG. 11 corrupted allocations, that is cases where the memory allocator appears have become corrupt can be detected. At step 104 strings are defined to each of a first and second variable. At step 106 memory is allocated to the first variable by calling malloc. A series of n subsequent dynamic memory operations are represented at step 108. It is assumed that there is no freeing (free) or reallocating (realloc) of the first variable. At step 110 memory is allocated to the second variable by calling malloc. If the same address is assigned to both of the first and second variables then the code must be suspect and an error message is produced indicating that at the (n+2)th operation [step 110] the allocator was corrupt as the same return was found at operation number 1 [step 106]. The choices offered are abort—terminate the program, or do—execute the allocation operation and continue. Of course similar error messages and options will occur for all mixes of malloc and realloc corruptions. The corresponding program listing and output messages are shown in Appendix A7.

The manner in which the dmat application intercepts calls to "malloc", "free" and so on is discussed with reference to FIGS. 12 and 13.

Figure 12A:
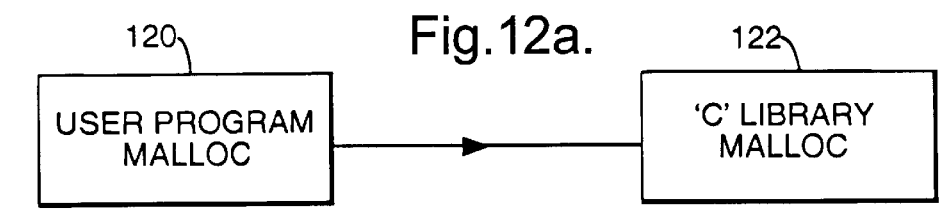
FIG. 12a shows a call to malloc under a conventional system.
Figure 12B:
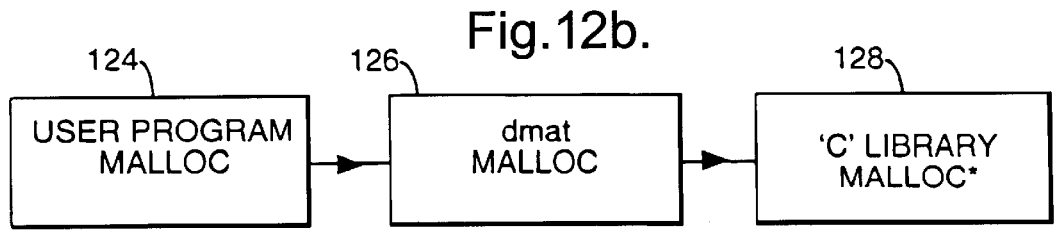
FIG. 12b shows a call to malloc under the invention.
Figure 13:
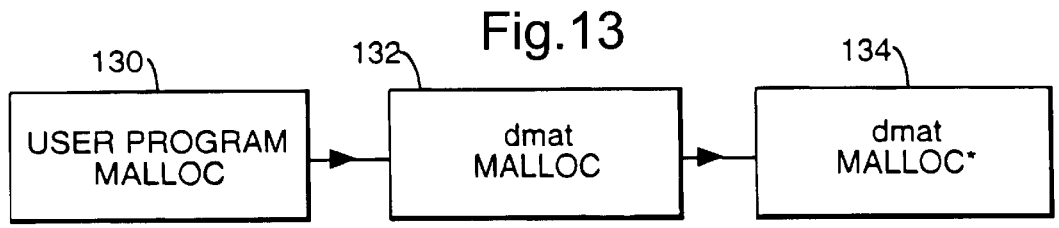
FIG. 13 shows a call to malloc under the invention avoiding a name clash.

As shown in FIG. 12a, in conventional systems without the system of the present invention, a call to malloc in the user program 120 transfers directly to malloc in the C library 122.

Introducing the system of the present invention, a call to malloc in the user program is passed to malloc in dmat 126 and hence to malloc * in the C library 128. Actual allocation is carried out in the C library.

Further there is a name clash when the user program needs to pick up the malloc in dmat. This can be dealt with by modifying the names in the system "C" library 128 (or at least a copy of it). The malloc module is extracted from the C library 128 and the name malloc is patched to MalloC. This module is then supplied as part of the dmat application as shown in FIG. 13 in which the call to malloc in the user program 130 transfers to malloc in dmat 132 and hence to MalloC* in dmat 134. The "C" library version of malloc is not used (its copy inside dmat is identical apart from its name, so memory allocation behaviour is not modified).

Accordingly the application can be used in various ways, for example

① To debug a visibly faulty program. Depending on the problem, the run-time error messages might be sufficient to indicate problems with the program, or it might be necessary to modify memory-allocation behaviour (by omitting "free" operations, or by using the allocation sub-process) to get the program working sufficiently. In the presence of an obscure bug, various options and combinations of options are tried. From the result of this (i.e. program output may or may not change, may become right, may be come wrong in a different way), it may be possible to reason what's wrong with the program. Although the system may be able to get a program working, generally the intention will be to fix the underlying problems so that the program works, at which stage the system may no longer need to be used.

② To check a ostensibly correct program. If an application runs satisfactorily, it is worth using the system to check for hidden problems. It may be that these problems are benign ones, or they may give rise to difficulties if the program is run with different dta. In any case, checking a critical program is of course highly desirable.

③ To look for memory leakage in an otherwise satisfactory program. The leakage report allows the sources of memory leakage to be traced and thus fixed.

④ To deal with, during normal run-time, all memory allocation procedures of the main application.

It will be appreciated that the memory monitoring process as discussed above can be used in relation to any computer language in which the relevant memory allocation problems occur. For example other languages in the same family as C, such as C++, are appropriate. The invention can of course be run on any suitable computer system as desired.

APPENDIX A1

```
main ()
{
  char *a, *b, *c;
  a = malloc (100);
  b = malloc (200);
  c = malloc (400);
  free (b);
}
produces the output
--- dmat: version version-number
--- dmat: statistics
  #malloc: 3
  #realloc: 0 (in-situ: 0, copy: 0)
  #free: 1
  max memory: 700
  final memory: 500
If dmat is requested to give a memory leakage report, it will also produce
the following output:
  op#  size
  ---  ---
   1   100
   3   400
```

APPENDIX A2

```
main ()
{
  free (0x1000);
}
produces the error message
* * * dmat #1: bad free (0x1000) - never allocated
options available
--- dmat: abort, do, omit (a/d/o)? [d]
```

APPENDIX A3

```
main ()
{
  char *a
  a = malloc (100);
  free (a);
  free (a);
}
produces error message:
* * * dmat #3 : bad free (0x1000) - already freed at #2
options available
--- dmat: abort, do, omit (a/d/o)? [d]
```

APPENDIX A4

```
main ()
{
  realloc (0x1000, 100);
}
produces the error message:
* * * dmat #1: bad realloc (0x1000, 100) - old address not allocated
options available
--- dmat: abort, do, salvage (a/d/s/)? [d]
```

APPENDIX A5

```
main ()
{
  char *a;
  a = malloc (100);
  free (a);
  realloc (a, 200);
}
(if a gets the value 0x1000) produces the error message:
*** dmat #3: bad realloc (0x1000, 200) - old address already freed at #2
options available
---dmat: abort, do, salvage (a/d/s)? [d]
```

APPENDIX A6

```
main ()
{
  char *a;
  a = malloc (-4);
  a = malloc (0);
  a = malloc (0x10000000);
}
produces the error messages:
* * * dmat #1: suspect malloc 0xfffffffd (or -4) bytes
* * * dmat #2: suspect malloc 0 bytes
* * * dmat #3: suspect malloc 0x10000000 bytes
For each error dmat will offer the choices:
--- dmat : abort, do (a/d)? [d]
```

APPENDIX A7

```
main ()
{
  char *a;
  char *a2;
  a = malloc (100);
  /* intervening code with n dynamic-memory operations */
  /* but no "free" or "realloc" of a*/
  a2 = malloc (200);
}
if this assigns the same value to a2 as it does to a, then the code must be
suspect, and dmat will produce the error message:
* * * dmat #n + 2: allocator corrupt - same return as #1
dmat will then offer the choices:
--- dmat: abort, do (a/d)? [d]
```

What is claimed is:

1. Apparatus for performing allocation of memory space during run-time of a program which makes memory allocation requests, the apparatus comprising allocator means arranged in use to execute as a process separate from that of a memory allocator associated with said program, the allocator means being arranged in use to intercept memory requests of said program and to allocate segments of memory in response thereto, the allocator means being further arranged to maintain an allocation section of memory having a structure corresponding to that of a working section of memory used by said program, the structure of said working section comprising first locations available for program use and second locations reserved for use by the memory allocator associated with said program, and wherein the arrangement is such that the allocator means, in use, upon intercepting memory requests by said program, allocates respective first locations of said working section to said program while leaving respective second locations unassigned, using, instead, locations within said allocation section corresponding to said respective second locations of said working section.

2. Apparatus according to claim 1, wherein said structure comprises sequences of groups of said first locations separated by groups of said second locations.

3. Apparatus according to claim 1, wherein the allocator means include means for initializing break values of said allocation and working sections to ensure that said sections have the same virtual address on start up of said program.

4. Apparatus according to claim 1, including monitor means associated with the allocator means for assessing memory requests of said program and, upon detecting an invalid memory request, interrupting operation of said program.

5. Apparatus according to claim 4, wherein said monitor means are arranged to maintain, in memory, respective lists of allocated memory segments and freed memory segments.

6. Apparatus according to claim 5, wherein said monitor means are arranged to detect invalid memory allocation requests which include one or more of the group of:
   free unallocated memory;
   free already freed memory;
   reallocate unallocated memory;
   reallocate already freed memory;
   allocate or reallocate negative, zero size or excessive amount of memory.

7. Apparatus according to claim 1, wherein the allocator means are arranged to exist as an object file attached to said program prior to run-time.

8. A data carrier carrying allocator means, the allocator means being as set forth in claim 1.

9. A data carrier carrying allocator means, the allocator means existing as an object file as set forth in claim 7.

10. A method of allocating memory space during run-time of a program, the method comprising:
   1) running said program, said program making memory allocation requests;
   2) executing an allocation process as a process separate from a memory allocation process, associated with said program, arranged to intercept said memory allocation requests and to allocate segments of memory to said program in response thereto; and
   3) maintaining an allocation section of memory having a structure corresponding to that of a working section of memory used by said program, the structure of said working section comprising first locations available for program use, and second locations reserved for use by the memory allocation process associated with said program, and wherein the allocation process, upon intercepting said memory allocation requests by said program, allocates respective first locations of said working section to said program while leaving respective second locations unassigned, using, instead, locations within said allocation section corresponding to said respective second locations of said working section.

11. A method according to claim 10, including initializing break values of said working and allocation sections to ensure that said sections have the same virtual address on start up of said program.

12. A method according to claim 10, wherein the monitor means assesses memory requests, and causes the program to interrupt upon direction of an invalid memory request.

13. A method according to claim 12, wherein the monitor process maintains, in memory, respective lists of allocated memory segments and freed memory segments for use in assessing the validity of memory requests.

14. A method according to claim 12, including detecting invalid memory allocation requests which include one or more of the group of:

free unallocated memory;

free already freed memory;

reallocate unallocated memory;

reallocate already freed memory;

allocate or reallocate negative, zero size or excessive amount of memory.

15. Apparatus according to claim 2, wherein the allocator means includes means for initializing break values of said allocation and working sections to ensure that said sections have the same virtual address on start up of said program.

16. A method according to claim 11, including executing a monitor means in association with the allocator process to assess memory requests by said program, and to interrupt the operation of said program upon detection of an invalid memory request.

* * * * *